April 20, 1937.  G. D. LEONARD  2,077,941
ENDLESS CONVEYER
Filed Jan. 31, 1936

Inventor
GLENN D. LEONARD.
By
Atty.

Patented Apr. 20, 1937

2,077,941

UNITED STATES PATENT OFFICE 2,077,941

ENDLESS CONVEYER

Glenn D. Leonard, Auburn, N. Y., assignor to International Harvester Company, a corporation of New Jersey Application January 31, 1936, Serial No. 61,765

11 Claims. (Cl. 198—193)

This invention relates to endless conveyers particularly for the type of conveyer used in the potato digger art as disclosed in the patent to B. Gronke et al. 1,673,193, granted June 12, 1928.

The main object of the invention is to provide a construction for the usual type of conveyers used in potato diggers, or in similar types of machinery where potatoes, beets, or other root crops, etc., are conveyed from one location to another, which prevents the exposed end portions of the conveyer links from marring or mutilating the harvested product so that the food quality and the market value of such products are not reduced.

Another object of the invention is to design the conveyer so that the sections or links can be quickly and easily attached and detached so that the elevator aprons may be lengthened or shortened.

Another object of the invention is to construct the links of the conveyer so that the tubers or other crop products are carried in pockets formed by the links which at the same time allow the discharge of vine stems, dirt, and other undesirable foreign material.

In accomplishing the foregoing objects and other minor objects which will hereinafter be more specifically described and defined in the claims, preferred forms of the approved details of structure are illustrated in the accompanying drawing, wherein:

The invention is herein disclosed as embodied in a potato digger or harvester of the type disclosed in the aforesaid patent to B. Gronke et al.

Figure 1:
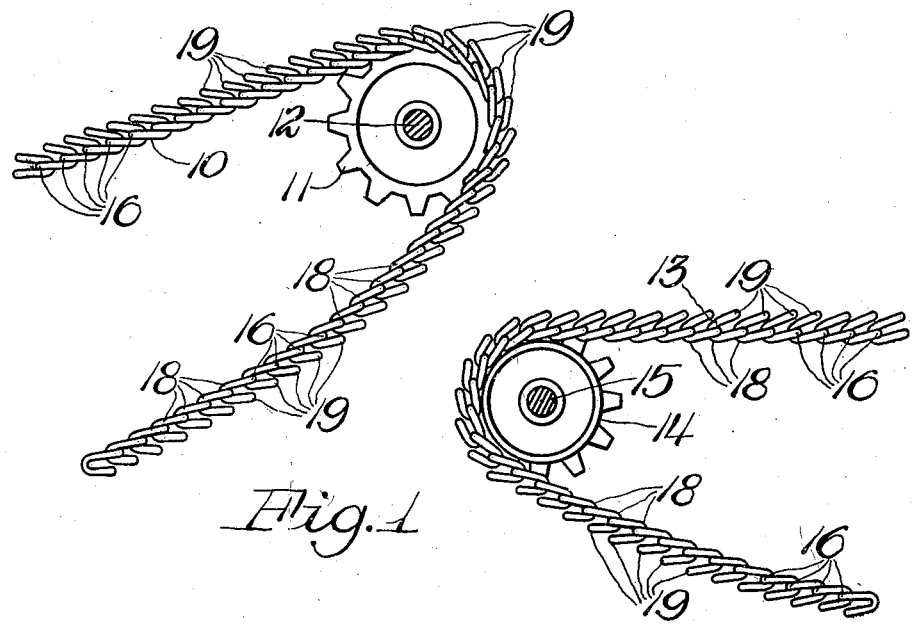
Figure 1 is a side elevation with the frame members and side seats of the digger removed showing the upper end of the digger elevator and the forward end of the extension elevator.

As shown in Figure 1, only a portion of the main conveyer apron and the extension apron is shown as this is all that is necessary for the understanding of my invention. The main apron 10 is shown operated by the apron drive sprocket 11 mounted on the sprocket shaft 12. The apron 10 is driven through the foregoing mechanism in the usual manner as disclosed in the aforementioned patent to Gronke, or in the patent to Smith 1,988,254, January 15, 1935, where the elevator aprons are driven by power from a tractor. The extension elevator 13 is formed from the same links as the main conveyer 10 and is driven from the main conveyer mechanism in the usual manner by mechanism connecting the rear shaft of the drive for the extension elevator which is not shown. The forward end of the conveyer is carried by sprockets 14 secured to a shaft 15. It is therefore, understood that the extension elevator 13 is driven in the same direction as the main elevator apron 10 through mechanism driven by the main elevator shaft 12.

The extension elevator 13 is usually placed below the lower end of the main apron 10 in order that the potatoes may be better separated by the drop between the conveyers, and the extension elevator is also usually provided to give better separation than can be had by the main digger apron. It is therefore obvious that the usual type of conveyer in which the links have been sheared from straight rods and then bent into shape present sharp edges which bruise the potatoes or other tubers as they are agitated by the digger mechanism. The potatoes or other vegetables then start to deteriorate at the point of the bruise thus rendering the product of less value when sold. This bruising of the potatoes is also increased by the drop from the main elevator on to the sharp ends of the links of the lower extension elevator. Many attempts to prevent the bruising of potatoes have been made, but with the construction of the links as shown in my invention, the bruising has been kept to a minimum.

Figure 2:
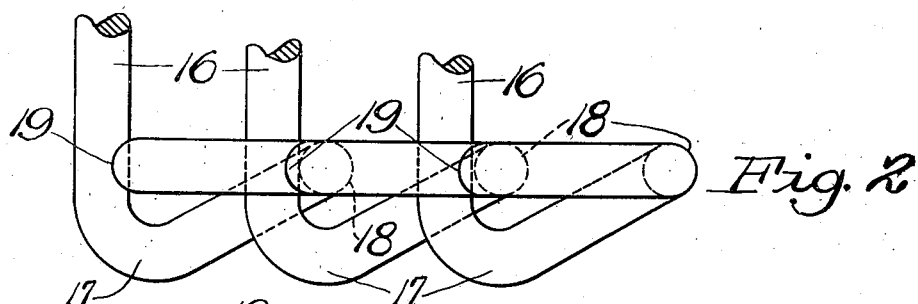
Figure 2 is a plan view of a portion of the elevator links showing their connection to each other and the rounded portion of the end of the links to prevent bruising.
Figure 3:
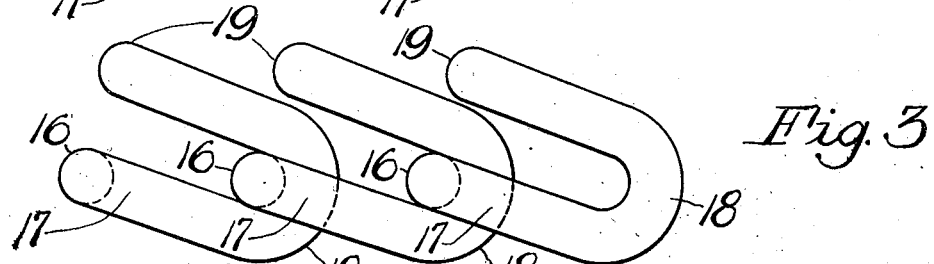
Figure 3 is a side elevation of Figure 2.
Figures 4, 5:
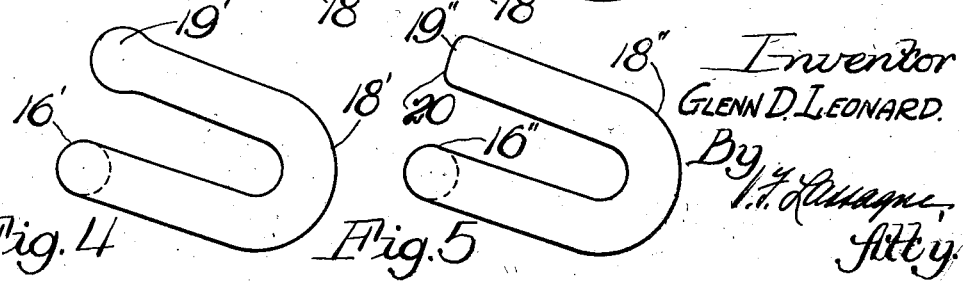
Figure 4 shows a modification of Figure 3.
Figure 5 shows another modification.

As shown in Figure 2, the digger apron is made up of a succession of rods or links 16 which are formed in a well-known manner. These links 16 may have straight transverse portions in the center, or, as is usual, alternate links may have raised portions through the center while the other links have depressed portions in their centers which form pockets to aid in the conveying of the potatoes. Figures 2 and 3 show a preferred construction of my invention in which the usual straight sheared portions of the ends of the links, as disclosed in the aforementioned patent to Gronke, have been milled or otherwise formed to form spherical ends tangent to the diameter of the rod used for forming the links. The ends of the links, therefore, terminate in a surface of generation about the axis of the link, thereby forming smooth ends for the link. The links or rods 16 are bent at both ends, as at 17, inwardly and rearwardly. At the pitch of the sprocket the links are again bent to form a hook portion 18 to receive the straight portion of another link 16. The hook portion 18 extends forwardly in a plane perpendicular to the transverse portion of the link and has the end 19 milled or formed in any suitable manner to provide a spherical end tangent to the surface of a rod. It is, therefore, seen that with this milled end 19 a smooth surface is presented which will not bruise the potatoes or vegetables which are conveyed by this type of conveyer. These links may be easily formed and are usually made by shearing the rods to length, then milling the ends 19 thereon after which they are bent in the usual manner. These links are readily attached to and detached from each other and the conveyers formed from these links may be made into any length desired. In the modification shown in Figure 4, the ends of the link may be forged or upset with a spherical end, the diameter of which is greater than the link. Figure 4 shows a link 16' similar to the link 16 having the hook portion 18' with the enlarged spherical end 19' formed at the outer end of the hook. It is, therefore, obvious that this spherical end 19' will also perform the same function as the spherical end 19 previously described.

Figure 5 shows another modification of a link 16" which is similar to the link shown in Figures 3 and 4 having a hook portion 18" with the end of the hook portion 18" having the end of the link 19" milled or formed so that it has a curved portion 20 tangent to the longitudinal portion of the hook and tangent to the squared end of the hook.

However, it is to be understood that the embodiment shown in Figures 1, 2, and 3 is the preferred form of my invention.

The preferred embodiment of the invention herein described is also capable of certain other modifications without departing from the scope of the invention to be defined in the following claims.

What is claimed is:

1. An endless conveyer for a potato harvester comprising a series of interlinked, separable links, each link including a transverse portion formed at its ends with angular arms disposed in a common plane, said arms continuing to form extensions in a reversed direction to that of the arms and forming bearing recesses for engagement by the transverse portion of the next adjacent link, said reversed extensions being in planes perpendicular to the transverse portion of the links, and the ends of said transverse portion terminating in a surface of generation about the axis of the link forming smooth ends for the link whereby material carried by the conveyer will not be bruised.

2. An endless conveyer for a potato harvester comprising a series of interlinked, separable links, each link including a transverse portion formed at its ends with angular arms disposed in a common plane, said arms continuing to form extensions in a reversed direction to that of the arms and forming bearing recesses for engagement by the transverse portion of the next adjacent link, said reversed extensions being in planes perpendicular to the transverse portion of the links, and the ends of said transverse portion terminating in a portion of a sphere, the diameter of which is equal to the diameter of the link whereby material carried by the conveyer will not be bruised.

3. An endless conveyer for a potato harvester comprising a series of interlinked, separable links, each link including a transverse portion formed at its ends with angular arms disposed in a common plane, said arms continuing to form extensions in a reversed direction to that of the arms and forming bearing recesses for engagement by the transverse portion of the next adjacent link, said reversed extensions being in planes perpendicular to the transverse portion of the links, and the ends of said transverse portion terminating in a surface of generation about the axis of the link forming a smooth end of the link which is larger in cross-section than the cross-section of the link whereby material carried by the conveyer will not be bruised.

4. An endless conveyer for a potato harvester comprising a series of interlinked, separable links, each link including a transverse portion formed at its ends with angular arms disposed in a common plane, said arms continuing to form extensions in an opposite direction to that of the arms and forming bearing recesses for engagement by the transverse portion of the next adjacent link, said opposite formed extensions being in a plane overlying that of the arms of which they are a continuation, and the ends of said transverse portion terminating in a surface of generation about the axis of the link forming smooth ends for the link whereby material carried by the conveyer will not be bruised.

5. An endless conveyer for a potato harvester comprising a series of interlinked, separable links, each link including a transverse portion formed at its ends with angular arms disposed in a common plane, said arms continuing to form extensions in an opposite direction to that of the arms and forming bearing recesses for engagement by the transverse portion of the next adjacent link, said opposite formed extensions being in a plane overlying that of the arms of which they are a continuation, and the ends of said transverse portion terminating in a surface of generation about the axis of the link formed by a curve tangent to the diameter of the link and tangent to the end of the link forming smooth ends for the link whereby material carried by the conveyer will not be bruised.

6. An endless conveyer for a potato harvester comprising a series of interlinked, separable links, each link including a transverse portion formed at its ends with angular arms disposed in a common plane, said arms continuing to form extensions in an opposite direction to that of the arms and forming bearing recesses for engagement by the transverse portion of the next adjacent link, said opposite formed extensions being in a plane overlying that of the arms of which they are a continuation, and the ends of said transverse portion terminating in a portion of a sphere, the diameter of which is equal to the diameter of the link whereby material carried by the conveyer will not be bruised.

7. An endless conveyer for a potato harvester comprising a series of interlinked, separable links, each link including a transverse portion formed at its ends with angular arms disposed in a common plane, said arms continuing to form extensions in an opposite direction to that of the arms and forming bearing recesses for engagement by the transverse portion of the next adjacent link, said opposite formed extensions being in a plane overlying that of the arms of which they are a continuation, and the ends of said transverse portion terminating in a surface of generation about the axis of the link forming a smooth end of the link which is larger in cross-section than the cross-section of the link whereby material carried by the conveyer will not be bruised.

8. As an article of manufacture, a link for endless conveyers of the separable link type, said link comprising a transverse portion formed at its ends with angular arms disposed in a common plane, said arms continuing to form extensions in a reversed direction to that of the arms and forming bearing recesses for engagement by the transverse portion of another link, the ends of said extensions terminating in a surface of generation about the axis of the link forming smooth ends for the link.

9. As an article of manufacture, a link for endless conveyers of the separable link type, said link comprising a transverse portion formed at its ends with angular arms disposed in a common plane, said arms continuing to form extensions in a reversed direction to that of the arms and forming bearing recesses for engagement by the transverse portion of another link, the ends of said extensions terminating in a portion of a sphere the diameter of which is equal to the diameter of the link.

10. As an article of manufacture, a link for endless conveyers of the separable link type, said link comprising a transverse portion formed at its ends with angular arms disposed in a common plane, said arms continuing to form extensions in a reversed direction to that of the arms and forming bearing recesses for engagement by the transverse portion of another link, the ends of said transverse portion terminating in a surface of generation about the axis of the link forming smooth ends for the link which is larger in cross-section than the cross-section of the link.

11. As an article of manufacture, a link for endless conveyers of the separable link type, said link comprising a transverse portion formed at its ends with hooked portions adapted to engage the transverse portion of another link, the ends of said hooked portions terminating in a surface of generation about the axis of the link formed by a curve tangent to the diameter of the link and tangent to the end of the link, forming smooth ends for the link.

GLENN D. LEONARD.